(12) United States Patent
Hargraves

(10) Patent No.: US 11,598,375 B2
(45) Date of Patent: Mar. 7, 2023

(54) LABYRINTH SEAL WITH INTERLOCKING ROTOR AND SEAL CASE INSERT

(71) Applicant: Amsted Rail Company, Inc., Chicago, IL (US)

(72) Inventor: James Hargraves, Richmond, VA (US)

(73) Assignee: Amsted Rail Company, Inc.

( * ) Notice: Subject to any disclaimer, the term of this patent is extended or adjusted under 35 U.S.C. 154(b) by 286 days.

(21) Appl. No.: 16/994,507

(22) Filed: Aug. 14, 2020

(65) Prior Publication Data
US 2021/0048071 A1    Feb. 18, 2021

Related U.S. Application Data

(60) Provisional application No. 62/888,004, filed on Aug. 16, 2019.

(51) Int. Cl.
| F16C 33/80 | (2006.01) |
| F16C 33/78 | (2006.01) |
| F16J 15/447 | (2006.01) |

(52) U.S. Cl.
CPC .......... *F16C 33/80* (2013.01); *F16C 33/7816* (2013.01); *F16J 15/447* (2013.01); *F16J 15/4476* (2013.01)

(58) Field of Classification Search
CPC ........... F16C 33/7816; F16C 33/782; F16C 33/7823; F16C 33/80; F16J 15/3252; F16J 15/3256; F16J 15/3264; F16J 15/447; F16J 15/4476
See application file for complete search history.

(56) References Cited

U.S. PATENT DOCUMENTS

| 1,978,739 | A | * | 10/1934 | Brittain, Jr. | F16C 33/80 277/420 |
| 6,170,992 | B1 | * | 1/2001 | Angelo | F16C 33/805 384/477 |
| 8,356,941 | B2 | * | 1/2013 | Mason | F16C 33/7813 384/477 |
| 8,360,651 | B1 | | 1/2013 | Fetty et al. | |
| 9,587,743 | B2 | * | 3/2017 | Jaskot | F16J 15/002 |
| 10,371,210 | B2 | | 8/2019 | Hargraves et al. | |
| 10,704,692 | B1 | * | 7/2020 | Tones | F16J 15/447 |
| 10,711,842 | B2 | * | 7/2020 | Liebe | F16J 15/3264 |
| 10,724,640 | B2 | * | 7/2020 | Jaskot | F16J 15/4476 |

(Continued)

OTHER PUBLICATIONS

PCT/US2020/046530 International Search Report and Written Opinion dated Oct. 30, 2020, 9 pages.

*Primary Examiner* — Nicholas L Foster
(74) *Attorney, Agent, or Firm* — Lathrop GPM LLP

(57) ABSTRACT

A labyrinth seal includes a seal case with an inner-diameter leg encircling a rotation axis, and an insert fixed in the seal case and encircling the rotation axis. The labyrinth seal also includes a slinger encircling the rotation axis and wrapping around the inner-diameter leg to cooperate with the seal case to form a first part of a labyrinth path. The slinger rotates relative to the seal case. The labyrinth seal also includes a rotor that encircles the rotation axis, cooperates with the insert to form a second part of the labyrinth path, and interlocks with the insert to limit axial movement of the rotor when the rotor rotates relative to the insert. The labyrinth seal may be combined with a bearing cone, a bearing cup, and a plurality of rollers to form a roller bearing assembly.

14 Claims, 4 Drawing Sheets

(56) References Cited

U.S. PATENT DOCUMENTS

| | | | |
|---|---|---|---|
| 10,753,478 B2* | 8/2020 | Tones | F16C 33/726 |
| 11,085,542 B2* | 8/2021 | Jaskot | F16J 15/4476 |
| 11,220,279 B2* | 1/2022 | Lumpkin | F16C 33/7886 |
| 11,365,810 B1* | 6/2022 | Tones | F16C 33/805 |
| 2010/0272381 A1 | 10/2010 | Hubbard | |
| 2011/0216993 A1* | 9/2011 | Mason | F16C 33/80 384/478 |
| 2013/0011090 A1 | 1/2013 | Shimizu et al. | |
| 2013/0228977 A1* | 9/2013 | Thomas, Jr. | F16J 15/447 277/413 |
| 2016/0040781 A1* | 2/2016 | Jaskot | F16J 15/4476 277/350 |
| 2017/0159825 A1* | 6/2017 | Jaskot | F16J 15/4476 |
| 2017/0370405 A1* | 12/2017 | Bender | F16J 15/164 |
| 2018/0128380 A1* | 5/2018 | Tones | F16J 15/4478 |
| 2018/0238453 A1* | 8/2018 | Jaskot | F16J 15/4476 |
| 2018/0355918 A1* | 12/2018 | Hargraves | F16J 15/4478 |
| 2019/0360532 A1* | 11/2019 | Liebe | F16J 15/3268 |
| 2021/0040991 A1* | 2/2021 | Fetty | F16C 33/7869 |
| 2021/0404518 A1* | 12/2021 | Fetty | F16C 33/7833 |
| 2022/0025974 A1* | 1/2022 | Jaskot | F16J 15/4476 |
| 2022/0163066 A1* | 5/2022 | Liebe | F16C 33/7813 |

* cited by examiner

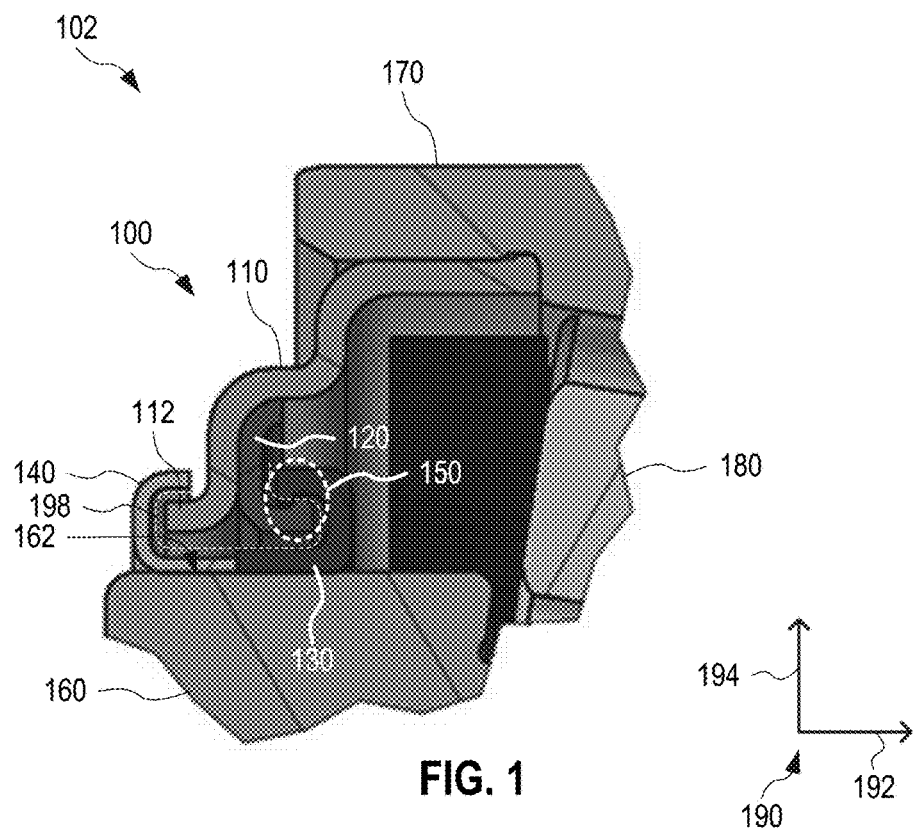
FIG. 1
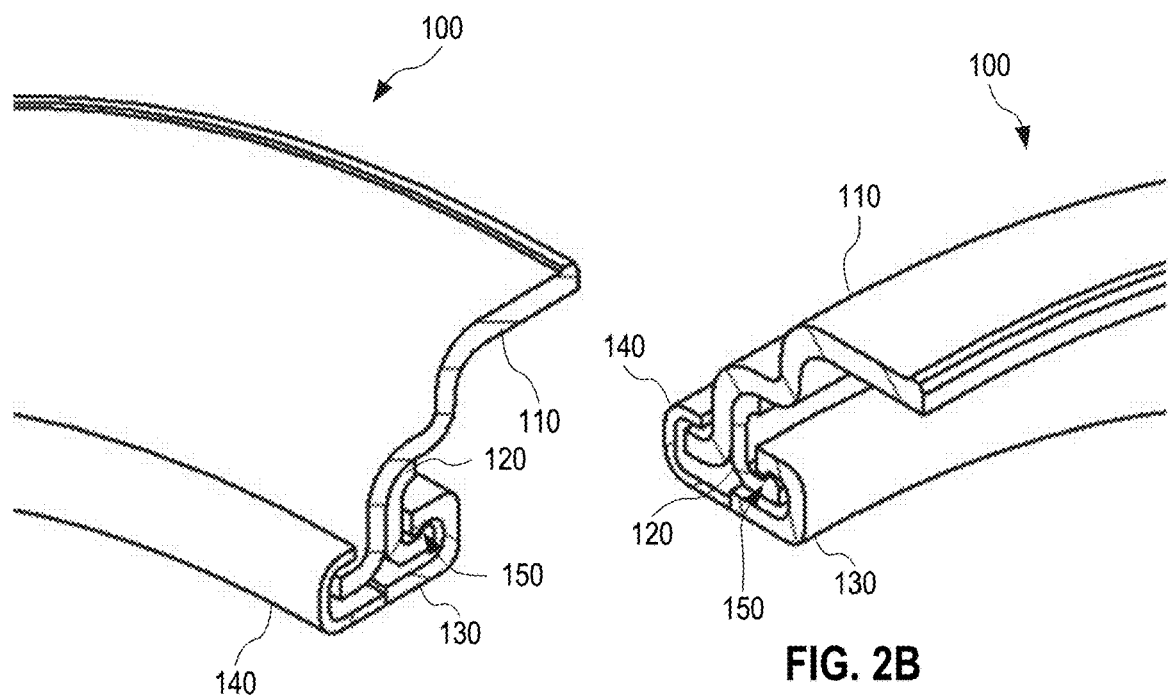
FIG. 2A
FIG. 2B

LABYRINTH SEAL WITH INTERLOCKING ROTOR AND SEAL CASE INSERT

CROSS-REFERENCE TO RELATED APPLICATION

This application claims priority to U.S. Provisional Patent Application No. 62/888,004, filed Aug. 16, 2019, the entirety of which is incorporated herein by reference.

BACKGROUND

Both ball bearings and roller bearings operate with a lubricant within the bearing to reduce friction between the balls/rollers and the raceways on which the balls/rollers roll. To contain the lubricant within the bearing and to prevent water, dirt, and other contaminants from entering the bearing, the bearing is equipped with a seal.

The seal may be a contact seal that forms a physical barrier, typically an elastomer gasket, between the inside of the bearing and the external environment. This physical barrier, however, requires direct contact between parts moving relative to each other, such as direct contact between one part that does not rotate and another part that rotates because it is affixed to a rotating journal. Thus, a contact seal is associated with friction which causes wear and tear of the physical barrier, especially in the presence of particulate contaminants. Best performance is achieved when the contact seal forms a labyrinth between stationary and rotating parts. This labyrinth limits transport of material between the external environment and the physical barrier to a tortuous path that reduces or prevents entry of contaminants into the bearing, thereby protecting the physical barrier. However, the friction at the physical barrier reduces fuel efficiency, may generate excessive heat at high speeds, and often presents a maintenance problem.

In contrast, a noncontact seal has no direct physical contact between non-rotating and rotating parts. One type of noncontact seal is a noncontact labyrinth seal, which forms a labyrinth between stationary and rotating parts. The noncontact labyrinth seal is conceptually similar to a contact seal forming a labyrinth, as discussed above, except that the noncontact labyrinth seal lacks a physical barrier bridging across the labyrinth. The noncontact labyrinth seal limits transport of material between the interior of the bearing and the external environment to a tortuous path that reduces or prevents both loss of lubricant from the bearing and entry of contaminants into the bearing. Some noncontact labyrinth seals include a slinger that rotates with the journal. The slinger's rotation, especially when operating at high rotation speeds, further prevents both transport of lubricant out of the bearing and entry of contaminants into the bearing.

SUMMARY

The present embodiments feature a labyrinth seal that may be used as part of a roller bearing assembly. Advantageously, a rotor and insert of the labyrinth seal interlock with each other to limit axial motion of the rotor (i.e., parallel to a rotation axis of the roller bearing assembly) without having to lock the rotor to a feature of the roller bearing assembly outside of the labyrinth seal. Accordingly, the present embodiments may be used in roller bearing assemblies that lack such a locking feature (e.g., a featureless cylindrical surface). Limiting axial motion of the rotor helps maintain the tortuous path by preventing the labyrinth from "opening up", which would allow contaminants to enter the bearing and lubricant to escape to the outside environment.

In embodiments, a labyrinth seal includes a seal case with an inner-diameter leg encircling a rotation axis, and an insert fixed in the seal case and encircling the rotation axis. The labyrinth seal also includes a slinger encircling the rotation axis and wrapping around the inner-diameter leg to cooperate with the seal case to form a first part of a labyrinth path. The slinger rotates relative to the seal case. The labyrinth seal also includes a rotor that encircles the rotation axis, cooperates with the insert to form a second part of the labyrinth path, and interlocks with the insert to limit axial movement of the rotor when the rotor rotates relative to the insert.

In other embodiments, a roller bearing assembly includes a bearing cone, a bearing cup encircling the bearing cone, and a plurality of rollers disposed between the bearing cone and the bearing cup to allow the bearing cone to rotate relative to the bearing cup. The roller bearing assembly also includes the labyrinth seal described above, wherein the seal case further includes an outer-diameter leg that (i) encircles the rotation axis, (ii) has a diameter greater than a diameter of the inner-diameter leg, and (iii) is rigidly coupled to the bearing cup. The rotor and the slinger are mounted on a cylindrical surface of the bearing cone, and the rotor interlocks with the insert to limit axial movement of the rotor toward the rollers.

In other embodiments, a method for sealing a roller bearing includes press fitting a rotor onto a bearing cone of the roller bearing, and coupling an outer-diameter leg of a seal case to a bearing cup of the roller bearing. The method also includes snap fitting an insert, fixed in the seal case, onto the rotor to (a) interlock the insert and rotor to limit axial movement of the rotor in a direction toward rollers disposed between the bearing cone and the bearing cup, and (b) form a first part of a labyrinth path between the rotor and the insert. The method also includes press fitting a slinger onto the bearing cone to (a) limit axial movement of the rotor in a direction away from the rollers, and (b) form a second part of the labyrinth path between an inner-diameter leg of the seal case and the slinger.

In other embodiments, an interlocking rotor for a labyrinth seal includes an innermost leg extending along a rotation axis of the interlocking rotor and encircling the rotation axis at a first radial distance from the rotation axis. The interlocking rotor also includes a locking leg extending along the rotation axis and encircling the rotation axis at a second radial distance from the rotation axis. The second radial distance exceeds the first radial distance, and the locking leg includes at least one locking feature protruding from the locking leg in direction toward the rotation axis. The interlocking rotor also includes a middle leg connecting the innermost leg and the locking leg.

BRIEF DESCRIPTION OF THE DRAWINGS

FIGS. 1, 2A, and 2B illustrate a labyrinth seal having interlocking rotor and seal case insert, in an embodiment.

DETAILED DESCRIPTION OF THE EMBODIMENTS

Figure 3:
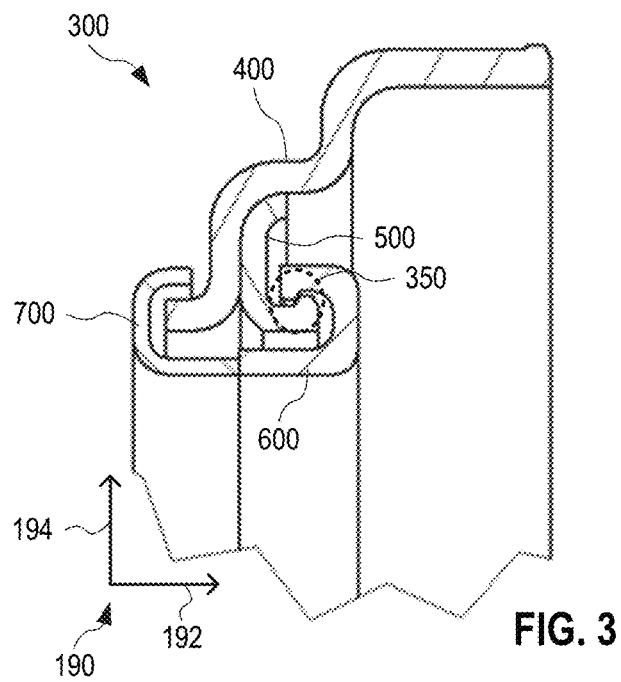
FIGS. 3-7 illustrate a labyrinth seal configured with a rotor and a seal case insert having interlocking protruding features, in an embodiment.
Figure 4:
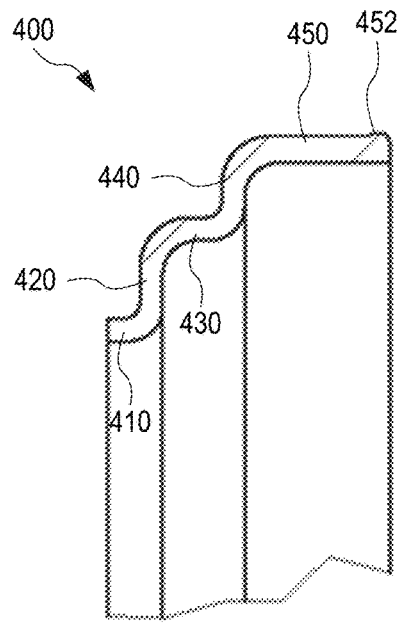
Figure 5:
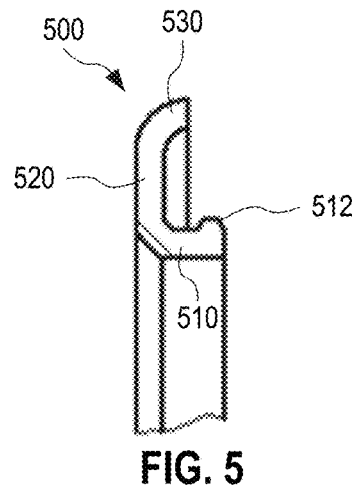
Figure 6:
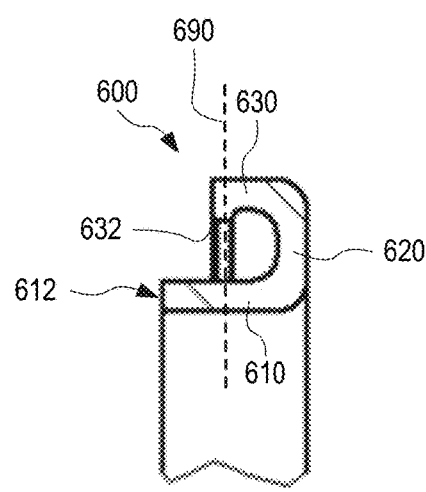
Figure 7:
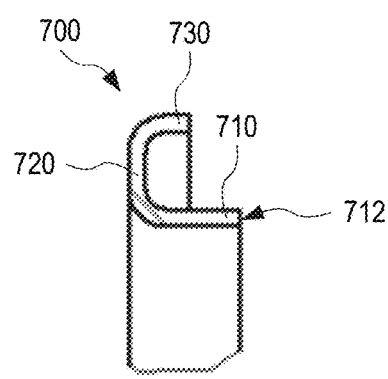

FIGS. 1, 2A, and 2B illustrate a labyrinth seal 100 having an interlocking rotor 130 and a seal case insert 120. FIG. 1 shows labyrinth seal 100 implemented in a roller bearing assembly 102. The view of FIG. 1 is a sectional view of a portion of roller bearing assembly 102 and labyrinth seal 100. FIGS. 2A and 2B are perspective views of a portion of labyrinth seal 100, as viewed from two different directions. FIGS. 1, 2A, and 2B are best viewed together in the following description.

Labyrinth seal 100 may be a noncontact seal. As depicted in FIG. 1, labyrinth seal 100 is configured to be implemented in a roller bearing assembly 102 that includes a plurality of rollers 180 disposed about a rotation axis of roller bearing assembly 102. Rollers 180 are disposed between a bearing cone 160 and a bearing cup 170. In operation, bearing cone 160 rotates relative to bearing cup 170 about the rotation axis, and rollers 180 roll accordingly to minimize friction in the rotation of bearing cone 160 relative to bearing cup 170.

Each of bearing cone 160, bearing cup 170, and labyrinth seal 100 encircle the rotation axis of roller bearing assembly 102. Here, "encircle" means that labyrinth seal 100 is shaped as a continuous ring or cylinder without gaps or holes. Equivalently, labyrinth seal 100 has a two-dimensional cross section (e.g., as shown in FIG. 1) that is rotated about the rotation axis to form labyrinth seal 100 in all three spatial dimensions. The same applies for bearing cone 160 and bearing cup 170. The rotation axis is parallel to axis 192 of coordinate system 190. Axis 194 of coordinate system 190 is parallel to a radial direction away from the rotation axis. Herein, "axial" refers to the direction parallel to the rotation axis (i.e., parallel to axis 192) and "radial" refers to the direction orthogonal to the rotation axis (i.e., parallel to axis 194).

Labyrinth seal 100 includes a seal case 110, an insert 120, a rotor 130, and a slinger 140, each encircling the rotation axis. Seal case 110 is fixed in bearing cup 170. Insert 120 is fixed in seal case 110. Slinger 140 is mounted on a cylindrical surface 162 of bearing cone 160 and wraps around an inner-diameter leg 112 of seal case 110. Slinger 140 is free to rotate relative to seal case 110 about the rotation axis. Slinger 140 cooperates with inner-diameter leg 112 to form a first part of a labyrinth path 198. Rotor 130 is also mounted on cylindrical surface 162 of bearing cone 160. In a region 150, rotor 130 interlocks with insert 120 to limit axial movement of rotor 130 in the direction away from slinger 140. Rotor 130 interlocks with insert 120 such that rotor 130 can rotate relative to insert 120 about the rotation axis. Rotor 130 cooperates with insert 120 to form a second part of labyrinth path 198. In certain embodiments and as depicted in FIG. 1, slinger 140 and rotor 130 are butted up against each other such that slinger 140 prevents axial movement of rotor 130 in the direction toward slinger 140.

The term "interlocking" does not necessarily mean that rotor 130 and insert 120 are in physical contact with each other. Generally, if rotor 130 and insert 120 should be in contact with each other, or come into contact with each other, during operation of roller bearing assembly 102, material wear will open up a gap between rotor 130 and insert 120. In one embodiment, rotor 130 and insert 120 are configured such that, when situated in their respective nominal positions, rotor 130 and insert 120 do not contact each other.

By virtue of interlocking rotor 130 and insert 120, labyrinth seal 100 eliminates the need to lock the position of rotor 130 directly to a locking feature of roller bearing assembly 102 outside labyrinth seal 100, and labyrinth seal 100 may therefore be implemented in roller bearing assemblies that lack such a locking feature. An example of such a locking feature would be a groove between a wear ring and a bearing cone in an roller bearing assembly where the labyrinth seal is mounted on the wear ring instead of on the bearing cone. This configuration may be found, for example, in U.S. Pat. No. 8,360,651. However, not all roller bearing assemblies have a wear ring or another suitable locking feature. Labyrinth seal 100 may be mounted on a featureless cylindrical surface and is therefore capable of being implemented in roller bearing assemblies that do not otherwise have a suitable locking feature for rotor 130.

Interlocking with insert 120 prevents rotor 130 from backing away from insert 120 in the direction toward rollers 180. If rotor 130 was not interlocked with insert 120, rotor 130 could separate from insert 120 during operation. Such separation would open labyrinth path 198 and thus reduce its sealing effect. In the worst case, rotor 130 could come into contact with rollers 180, which would likely lead to rapid failure of roller bearing assembly 102. Labyrinth seal 100, by virtue of rotor 130 being interlocked with insert 120, advantageously solves these problems and allows for rotor 130 and slinger 140 to be mounted to a cylindrical surface, such as cylindrical surface 162.

Each of seal case 110 and slinger 140 may be made of steel. In one example, seal case 110 is made from flat roll steel, e.g., stainless steel, AISI 1010 carbon steel, or AISI 1006 carbon steel. Each of rotor 130 and insert 120 may be made of a polymer, such as a thermoset plastic or a thermoplastic, for example polybutylene terephthalate.

Without departing from the scope hereof, labyrinth seal 100 may be implemented in other types of bearing assemblies, e.g., a ball bearing assembly, that include an inner part forming cylindrical surface 162 and an outer part (in place of bearing cup 170) to which seal case 110 may be coupled.

FIGS. 3-7 illustrate a labyrinth seal 300 configured with a rotor 600 and a seal case insert 500 having interlocking protruding features. Labyrinth seal 300 is an embodiment of labyrinth seal 100 of FIGS. 1, 2A, and 2B. FIG. 3 is a sectional view of labyrinth seal 300. Labyrinth seal 300 includes a seal case 400, an insert 500, a rotor 600, and a slinger 700, each of which encircle the rotation axis of labyrinth seal 300. FIGS. 4, 5, 6, and 7 are sectional views of seal case 400, insert 500, rotor 600, and slinger 700, respectively. FIGS. 3-7 are best viewed together in the following description.

Seal case 400 includes an inner-diameter leg 410 and an outer-diameter leg 450 having a greater diameter than inner-diameter leg 410. Slinger 700 wraps around inner-diameter leg 410. Each of inner-diameter leg 410 and outer-diameter leg 450 may be axial legs. Herein, an "axial leg" refers to a leg that is parallel, or predominantly parallel, to the rotation axis of labyrinth seal 300. Thus, an axial leg is parallel to axis 192 of coordinate system 190. Also herein, a "radial leg" refers to a leg that is orthogonal, or predominantly orthogonal, to the rotation axis of labyrinth seal 300. Thus, a radial leg is orthogonal to axis 192 of coordinate system 190, or parallel to axis 194 of coordinate system 190. Outer-diameter leg 450 may include a radially protruding locking bead 452 configured to lock outer-diameter leg 450 to bearing cup 170 (as depicted in FIG. 1) by snapping locking bead 452 into a matching groove in bearing cup 170. Inner-diameter leg 410 and outer-diameter leg 450 are indirectly connected to each other via legs 420, 430, and 440. Legs 420 and 440 may be radial legs and leg 430 may be an axial leg.

Rotor 600 includes an axial innermost leg 610 and an axial locking leg 630 that are connected by a radial leg 620. Locking leg 630 is the outermost leg of the rotor 600 from the rotation axis. Innermost leg 610 is configured to be press fit onto a cylindrical surface such as cylindrical surface 162. Locking leg 630 includes a protruding feature 632 that extends radially inward (toward the rotation axis of labyrinth seal 300). In one embodiment, protruding feature 632 is a continuous rim that encircles the rotation axis. In another embodiment, protruding feature 632 is a series of protruding tabs disposed about the rotation axis.

Insert 500 includes an axial locking leg 510, a radial leg 520, and a bend or axial leg 530. Radial leg 520 extends radially outward from locking leg 510 to connect with bend/axial leg 530. Radial leg 520 and bend/axial leg 530 fit against legs 420 and 430 of seal case 400 such that insert 500 may be mounted (for example press fit) in seal case 400. Locking leg 510 includes a protruding feature 512 that extends radially outward. In one embodiment, protruding feature 512 is a continuous rim that encircles the rotation axis. In another embodiment, protruding feature 512 is a series of protruding tabs disposed about the rotation axis.

In labyrinth seal 300, locking legs 510 and 630 overlap in the axial dimension, and protruding feature 632 is closer than protruding feature 512 to seal case 400. Protruding features 512 and 632 overlap in the radial dimension. Thus, in a region 350, protruding features 512 and 632 cooperate to interlock rotor 600 and insert 500, i.e., limit axial movement of rotor 600 in the axial direction away from insert 500 (i.e., to the right in FIG. 3).

Slinger 700 includes an axial innermost leg 710, a radial leg 720, and an axial leg 730. Radial leg 720 extends radially outward from innermost leg 710 to connect to axial leg 730. Innermost leg 710 terminates in an end 712 that is butted up against an end 612 of innermost leg 610 of rotor 600. Slinger 700 thereby prevents axial movement of rotor 600 in the direction toward insert 500 and slinger 700 (i.e., to the left in FIG. 3).

Without departing from the scope hereof, seal case 400 may be configured without legs 430 and leg 440, such that leg 420 connects directly to leg 450. In this alternative embodiment, insert 500 may be configured to fit against legs 420 and 450.

Slinger 700 and seal case 400 cooperate to form a first part of a labyrinth path therebetween. Insert 500 and rotor 600 cooperate to form a second part of the labyrinth path therebetween. Innermost legs 710 and 610 cooperate to connect the first and second parts of this labyrinth path to form an example of labyrinth path 198 shown in FIG. 1.

It should be understood that each of seal case 400, insert 500, rotor 600, and slinger 700 may be provided as a standalone product configured to cooperate with the remaining ones of seal case 400, insert 500, rotor 600, and slinger 700 provided by a third party. For example, rotor 600 may be a standalone product configured to cooperate with a seal case 400, an insert 500, and a slinger 700 provided by a third party.

Figure 8:
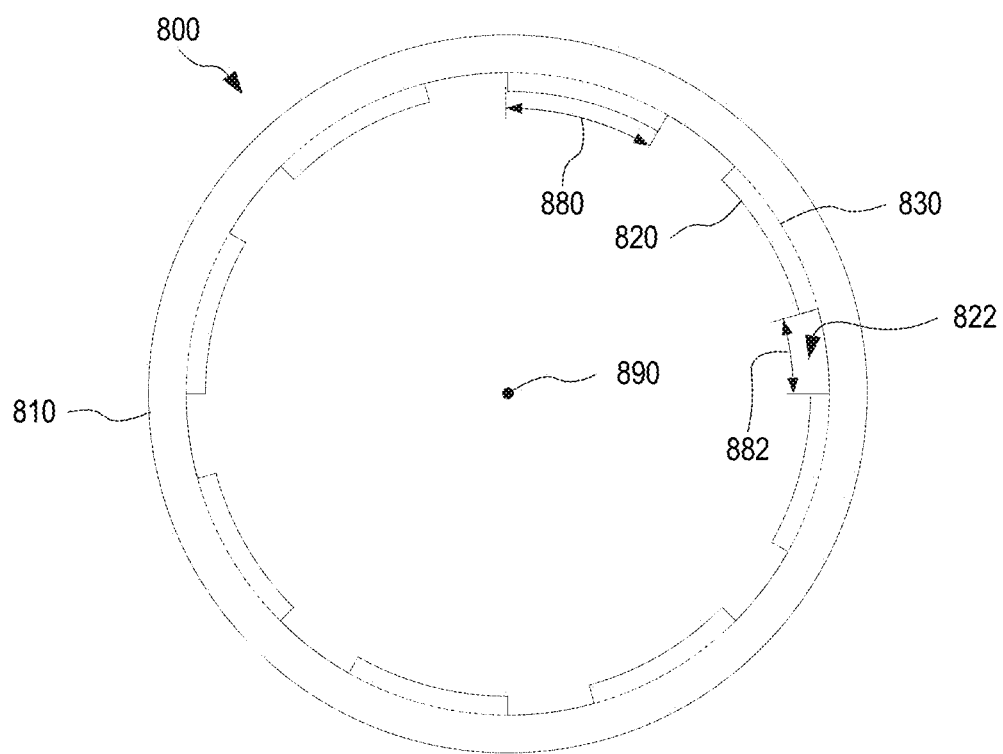
FIG. 8 illustrates a rotor having a series of protruding tabs, in an embodiment.

FIG. 8 illustrates a rotor 800 having a series of protruding tabs 820. Rotor 800 is an embodiment of rotor 600 that implements protruding feature 632 as the series of tabs 820. FIG. 8 shows a cross section of rotor 800 in a plane that is orthogonal to a rotation axis 890 of rotor 800 and coincides with the location of tabs 820. The location of the plane of the cross section of rotor 800 in FIG. 8 corresponds to the location of a plane 690 indicated in FIG. 6.

Tabs 820 extend radially inward from a locking leg 810 of rotor 800. Locking leg 810 is an embodiment of locking leg 630. Locking leg 810 is generally cylindrical, apart from at tabs 820, and therefore encircles rotation axis 890. The inner diameter 830 of the cylindrical shape of locking leg 810, away from tabs 820, is indicated by a dashed circle. Each tab 820 has an angular extent 880 and is separated from its adjacent tabs by a gap 822 characterized by an angular extent 882. In gaps 822, locking leg 810 is characterized by inner diameter 830. Angular extent 880 may be the same as, greater than, or less than angular extent 882. Rotor 800 may have more or fewer tabs 820 than depicted in FIG. 8 without departing from the scope hereof.

Rotor 800 may be configured to interlock with an embodiment of insert 500 wherein protruding feature 512 is a plurality of tabs similar to tabs 820 except for facing radially outward. The tabs of this embodiment of insert 500 may have a different angular extent 880 than that of tabs 820, and this embodiment of insert 500 may have a different number of tabs.

Figure 9:
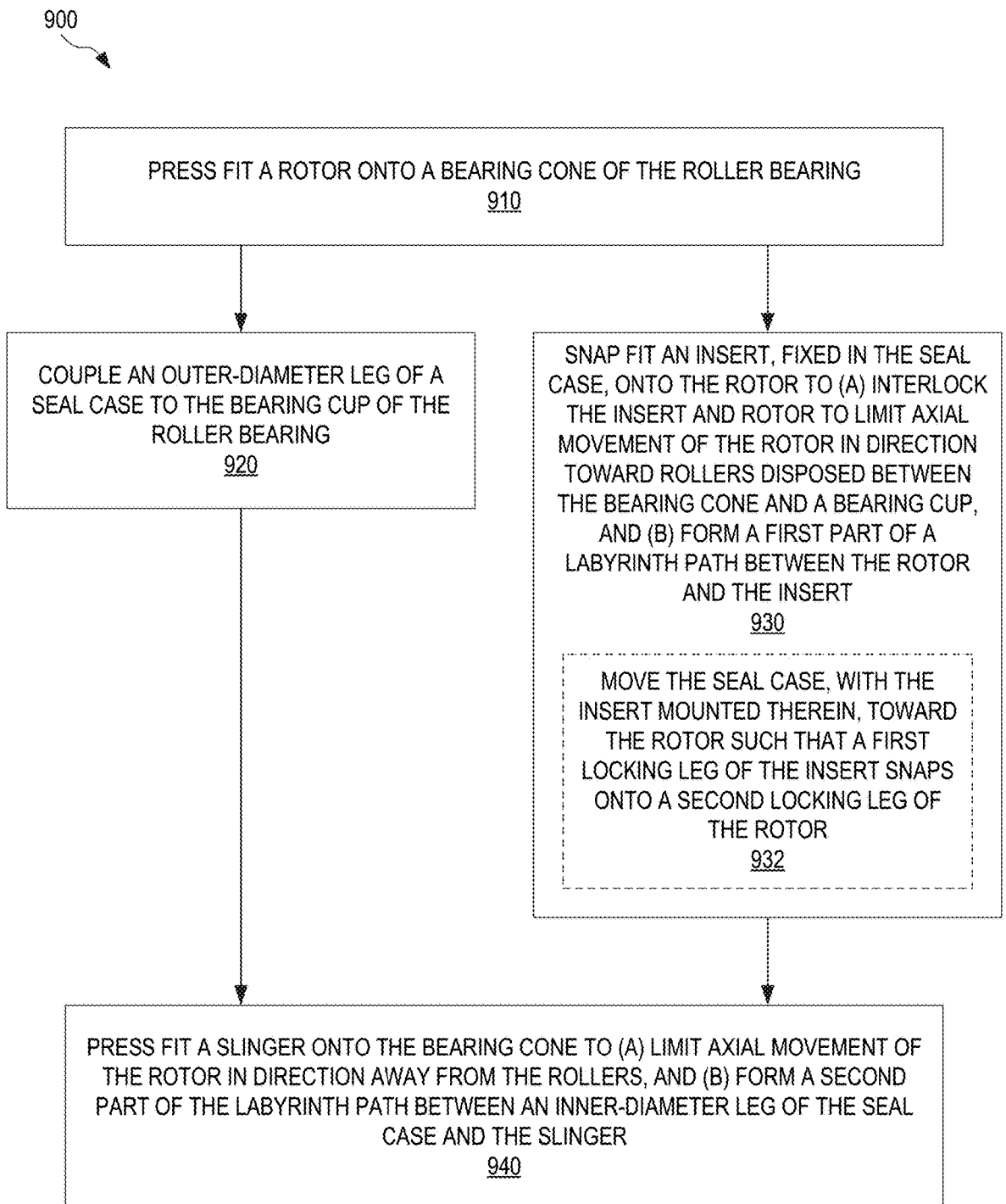
FIG. 9 is a flowchart of a method for sealing a roller bearing, in embodiments.

FIG. 9 is a flowchart of a method 900 for sealing a roller bearing. Method 900 is used, for example, to construct labyrinth seal 100 in roller bearing assembly 102 of FIGS. 1, 2A, and 2B. Method 900 includes steps 910, 920, 930, and 940.

Step 910 press fits a rotor onto a bearing cone of the roller bearing. In one example of step 910, rotor 130 is press fit onto bearing cone 160 of a roller bearing that includes bearing cone 160, bearing cup 170, and rollers 180 disposed therebetween (as depicted in FIG. 1).

Step 920 couples an outer-diameter leg of a seal case to the bearing cup of the roller bearing. In one example of step 920, an outer-diameter leg of seal case 110, such as outer-diameter leg 450, is coupled to bearing cup 170. Step 920 may include snapping a locking bead of the outer-diameter leg into a groove in the bearing cup. For example, locking bead 452 may be snapped into a matching groove in bearing cup 170.

Step 930 snap fits an insert, fixed in the seal case, onto the rotor to (a) interlock the insert and rotor to limit axial movement of the rotor in direction toward rollers disposed between the bearing cone and a bearing cup, and (b) form a first part of a labyrinth path between the rotor and the insert. In one example of step 930, insert 120, fixed in seal case 110, is snap fitted onto rotor 130 to limit axial movement of rotor 130 in the direction toward rollers 180 and to form a first part of labyrinth path 198. Step 930 may include a step 932 of moving the seal case, with the insert mounted therein, toward the rotor such that a first locking leg of the insert snaps onto a second locking leg of the rotor. In one example of step 932, seal case 400, with insert 500 fixed therein, is moved along cylindrical surface 162 toward rotor 600, until protruding feature 512 is past protruding feature 632 such that locking leg 510 snaps onto locking leg 630, as depicted in FIG. 3.

Steps 920 and 930 may be performed simultaneously by axially pushing the seal case (e.g., seal case 110), with the insert (e.g., insert 120) fixed therein, along a bearing cone (e.g., along cylindrical surface 162 of bearing cone 160) in the direction toward the rotor (e.g., rotor 130) until a locking leg of the insert (e.g., locking leg 510) snaps onto the a locking leg of the rotor (e.g., locking leg 630).

Step 940 press fits a slinger onto the bearing cone to (a) limit axial movement of the rotor in direction away from the rollers, and (b) form a second part of the labyrinth path between an inner-diameter leg of the seal case and the slinger. In one example of step 940, slinger 140 is press fit onto cylindrical surface 162 of bearing cone 160 such that slinger 140 buts up against rotor 130 (e.g., end 712 of slinger 700 buts up against end 612 of rotor 600), so as to (a) limit axial movement of rotor 130 in the direction away from rollers 180 and (b) form a second part of labyrinth path 198.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A labyrinth seal, comprising:
    a seal case with an inner-diameter leg encircling a rotation axis;
    an insert encircling the rotation axis, the insert having a first side contacting the seal case and a second side facing away from the seal case, the insert forming a second locking leg that extends axially away from the second side;
    a slinger encircling the rotation axis and wrapping around the inner-diameter leg to cooperate with the seal case to form a first part of a labyrinth path, the slinger having a second innermost leg that forms a second locking feature protruding radially away from the rotation axis; and
    a rotor encircling the rotation axis and cooperating with the insert to form a second part of the labyrinth path, the rotor having a first innermost leg and a first locking leg, wherein the first locking leg (i) is radially farther from the rotation axis than the second locking feature, (ii) extends axially toward the second side of the insert to axially overlap with the second locking leg, and (iii) forms a first locking feature that protrudes radially toward the rotation axis, the first locking feature being axially closer to the first side of the insert than the second locking feature;
    wherein:
    the first innermost leg and the second innermost leg extend axially toward each other to limit axial movement of the rotor toward the slinger; and
    the first locking feature extends radially to overlap with the second locking feature such that the second locking feature, when engaged with the first locking feature, limits axial movement of the rotor away from the insert.

2. The labyrinth seal of claim 1, the first innermost leg and the second innermost leg cooperating to connect the first part and the second part of the labyrinth path.

3. The labyrinth seal of claim 1, the first locking feature including a plurality of protruding features spaced apart from each other, disposed at different respective azimuthal locations relative to the rotation axis, and protruding from the first locking leg toward the rotation axis.

4. The labyrinth seal of claim 1, the rotor being made of polymer.

5. The labyrinth seal of claim 4, the rotor including a middle section connecting the first innermost leg with the first locking leg.

6. The labyrinth seal of claim 5, the first innermost leg and the first locking leg being parallel to the rotation axis.

7. The labyrinth seal of claim 4, the insert being made of polymer.

8. The labyrinth seal of claim 1, the first locking feature including a continuous rim encircling the rotation axis and protruding from the first locking leg toward the rotation axis.

9. The labyrinth seal of claim 1, the seal case further including:
    an outer-diameter leg; and
    an axially oriented leg and a radially oriented leg forming a step, the insert being press fit into the step; each of the axially oriented leg and radially oriented leg being located between the inner-diameter leg and the outer-diameter leg.

10. A roller bearing assembly, comprising:
    a bearing cone;
    a bearing cup encircling the bearing cone;
    a plurality of rollers disposed between the bearing cone and the bearing cup to allow the bearing cone to rotate relative to the bearing cup; and
    the labyrinth seal of claim 1, the seal case further including an outer-diameter leg that (i) encircles the rotation axis, (ii) has a diameter greater than a diameter of the inner-diameter leg, and (iii) is rigidly coupled to the bearing cup;
    wherein the rotor and the slinger are mounted on a cylindrical surface of the bearing cone, and the rotor interlocks with the insert to limit axial movement of the rotor toward the plurality of rollers.

11. The roller bearing assembly of claim 10, the rotor being interference fit onto the bearing cone.

12. A method for sealing a roller bearing, comprising:
    press fitting a rotor onto a bearing cone of the roller bearing;
    coupling an outer-diameter leg of a seal case to a bearing cup of the roller bearing;
    snap fitting an insert, fixed in the seal case, onto the rotor to (i) interlock the insert and rotor to limit axial movement of the rotor in a direction toward rollers disposed between the bearing cone and the bearing cup, and (ii) form a first part of a labyrinth path between the rotor and the insert, wherein said snap fitting comprises moving the seal case, with the insert affixed therein, toward the rotor such that a first locking leg of the insert snaps onto a second locking leg of the rotor; and
    press fitting a slinger onto the bearing cone to (i) limit axial movement of the rotor in a direction away from the rollers, and (ii) form a second part of the labyrinth path between an inner-diameter leg of the seal case and the slinger.

13. The method of claim 12, wherein:
    the first locking leg extends toward the rotor and has first locking features protruding radially outward;
    the second locking leg extends toward the insert and has second locking features protruding radially inward; and
    said moving comprises moving the seal case such that the first locking features are moved axially past the second locking features.

14. The method of claim 12, further comprising moving the seal case axially toward the bearing cup and rotor to simultaneously perform said coupling and snap fitting.

* * * * *